United States Patent [19]

Hareng et al.

[11] 4,277,145

[45] Jul. 7, 1981

[54] LIQUID-CRYSTAL DISPLAY DEVICE

[75] Inventors: Michel Hareng; Serge Le Berre; Pierre Leclerc, all of Paris, France

[73] Assignee: Thomson-CSF, Paris, France

[21] Appl. No.: 104,550

[22] Filed: Dec. 17, 1979

[30] Foreign Application Priority Data

Dec. 15, 1978 [FR] France .................. 78 35382

[51] Int. Cl.³ ............................................. G02F 1/135
[52] U.S. Cl. .................................. 350/351; 350/342; 350/350 S
[58] Field of Search ...................... 350/342, 350 S, 351

[56] References Cited

U.S. PATENT DOCUMENTS

| 3,999,838 | 12/1976 | Sprokel .............................. 350/351 |
| 4,150,396 | 4/1979 | Hareng et al. ..................... 350/351 X |
| 4,196,974 | 4/1980 | Hareng et al. ..................... 350/351 X |

Primary Examiner—Edward S. Bauer
Attorney, Agent, or Firm—Oblon, Fisher, Spivak, McClelland & Maier

[57] ABSTRACT

In a liquid-crystal display device, a smectic liquid-crystal layer and a layer of photoconductive material are placed between two transparent plates. A voltage is applied to the photoconductor by means of electrodes while scanning the photoconductor with a writing light beam. At locations in which the resistance of the photoconductor is reduced under the action of the light beam, the heat generated causes transition of the liquid crystal to the isotropic state. The light-scattering action produced by subsequent cooling of the liquid crystal has the effect of writing the image to be displayed.

4 Claims, 1 Drawing Figure

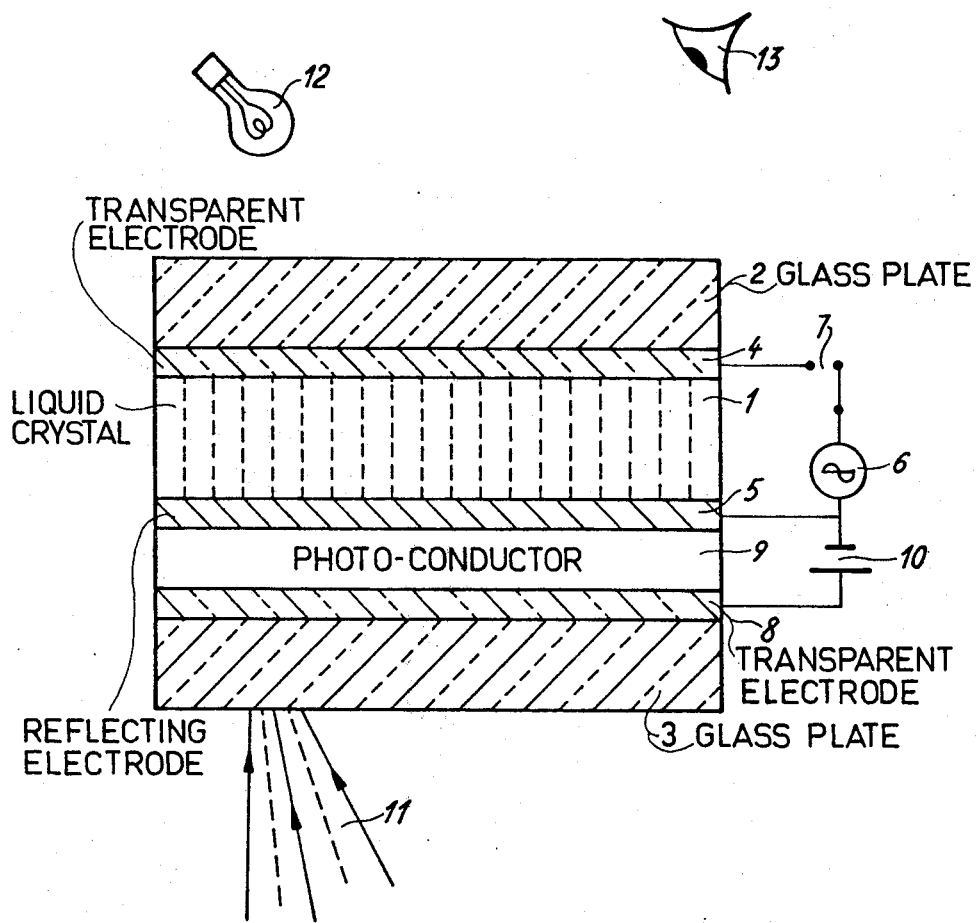

LIQUID-CRYSTAL DISPLAY DEVICE

This invention relates to liquid-crystal display devices for the visualization of drawings, the contents of which are represented by an electrical signal such as a video signal, for example.

In French Pat. No. 74 20715 granted to the present Applicant on Feb. 13th, 1976 on the basis of an Application filed on June 14th, 1974, there was described a visual display device which utilized a thermoelectric effect in a liquid-crystal film, writing of the image being performed by scanning of the film with an infrared beam produced by a laser and deflected by electro-optical deviators (Publication No. 2,275,087).

The heating power to be delivered by the infrared beam makes it necessary to employ a high-power laser such as a solid-state laser of the YAG type, for example. This is a costly solution, however, and calls for powerful cooling which is usually obtained by means of water and thus involves a large number of conditions and limitations.

Moreover, the infrared emission has a long wavelength ($\lambda = 1.06$ $\mu$), thus entailing the need for special optical components and in particular an acoustooptic deflector of the lead molybdate type, for example, which is not only expensive but offers low resolution (400 points at a maximum).

The aim of the invention is to permit a substantial reduction in the power required for the writing laser employed in an apparatus of this type. It is accordingly possible to employ a low-power laser (of the helium-neon type, for example) which is low in cost price and emits in the visible region of the spectrum. This laser does not call for any cooling and it is possible to employ conventional optical components as well as a deflector of the acoustooptic type having high resolution (over 1000 points).

To this end, the invention proposes to limit the function of the laser to addressing of the points to be written and to cause generation of heat at the points thus addressed by means of a source of energy which is located within the visual display cell itself and the operation of which is triggered by the emergent light beam produced by the laser.

Further properties and advantages of the invention will become readily apparent from the following description which is presented by way of example and not in any limiting sense, reference being made to the single accompanying FIGURE which is a schematic sectional view of a visual display cell.

The cell under consideration comprises a liquid-crystal film-layer 1, for example of cyano-octyl-biphenyl designated by the abbreviation COB and maintained in the smectic state by thermostatic means (not shown in the FIGURE), namely in the case of COB, for example, at a temperature of 27° C. located between the crystal-smectic transition (21.5° C.) and the smectic-nematic transition (32° C.). Said liquid-crystal layer is located between two transparent plates 2 and 3 (of glass, for example) which delimit the display cell. A first transparent electrode 4 (of mixed oxide of indium and tin, for example) is deposited between the liquid crystal and the substrate 2.

The other face of the liquid-crystal layer rests on a reflecting metallic film-layer 5 which makes it possible to apply an electric field to the liquid crystal by means of the electrode 4. Said electric field is produced by means of a voltage generator and preferably an a.c. voltage generator 6, and a switch 7. In a manner which is known in the art, it is possible to carry out either selective erasure at a voltage of 30 V in respect of a thickness of COB of 15 $\mu$ or total erasure at a voltage of 70 V. The relative thickness of said metallic layer must be fairly substantial in order to prevent light from passing through the layer while being sufficiently small to permit rapid transmission of the writing heat. Good results are obtained, for example, with an aluminum layer having a thickness within the range of 1000 to 2000 Å.

On the side corresponding to the liquid crystal, the plate 3 supports a transparent electrode 8.

A photoconductive film-layer 9 formed of cadmium selenide having a dark resistivity of 0.2 M$\Omega$m, for example, is inserted between the metallic layer 5 and the electrode 8. Said photoconductive layer must be of relatively substantial thickness in order to develop the desired heating effect while remaining sufficiently thin to prevent spreading of the writing point in width. In a practical construction in which the display cell is a square of side 2 cm and the writing point has a diameter of 15 $\mu$, the film-layer of CdSe obtained by evaporation has a thickness of 1 $\mu$.

The photoconductive layer aforesaid is supplied from a d.c. voltage source 10 which is connected between the metallic layer and the electrode 8.

In order to write the desired drawings, a light beam 11 is projected onto the photoconductive film-layer, said light beam being generated, deflected and focused by means which has not been illustrated and are known in the art. According to the invention, the light beam is of low energy and advantageously obtained from an He-Ne laser having an emission wavelength of 6328 Å. The nominal power of a laser of this type is typically of the order of one milliwatt and the illumination obtained on a point 15 $\mu$ in diameter permits a drop in resistivity at this point of the CdSe layer of $10^6$ in less than 50 $\mu$s.

Under these conditions, the current delivered by the source 10 is concentrated at the illuminated point at which practically the entire quantity of energy produced is dissipated. By conduction, the heat thus dissipated causes a transition of the liquid crystal to the isotropic phase at a point located directly above the illuminated point. When illumination of the photoconductor is removed, the crystal cools and acquires strong light-scattering capability. The light produced by a source 12 and reflected from the display cell thus enables the observer 13 to see a black point by contrast effect at the location in which the crystal is in the light-scattering state.

In order to write a point of this type in the example of construction herein described, the power dissipated within the layer 9 at said point must be approximately 20 mW, thus making it necessary to supply a voltage of 4.5 V to the source 10. The dielectric strength of the layer 9 is wholly sufficient to withstand this voltage in the case of the thickness of 1 $\mu$ described earlier.

When there is no illumination, the current delivered into the entire layer 9 dissipates approximately 0.02 W/cm$^2$, thus producing slight general heating of the entire display cell and performing the contributory role of maintaining the liquid crystal in the smectic state.

In order to erase written information, the voltage delivered by the source 6 is applied by means of the switch 7 either without scanning the laser beam 11 and by employing a high voltage for erasing the entire surface or by re-scanning the beam 11 at those locations in which it is desired to effect selective erasure and by making use of a lower voltage.

Different modes of writing can be obtained by combining the effects of the beam 11 and of the source 6; and if a video voltage is applied by means of this source, an image composed of half-tones can accordingly be obtained.

Visual display of this image is not limited to direct viewing as described in the foregoing and projection on a large screen can advantageously be carried out with a Schlieren lens. The double optical path resulting from observation by reflection from the layer 5 also results in enhanced contrast in comparison with observation by transmission in devices of the prior art.

It is also possible to project by transmission by adopting transparent material in the case of the electrode 5 which separates the liquid crystal from the photoconductive material. A laser which emits a beam in the invisible region of the spectrum such as an infrared laser, for example, will accordingly be employed in this case.

What is claimed is:

1. A liquid-crystal display device for visualizing information and comprising:
    a first and a second transparent plates;
    a smectic liquid-crystal layer inserted between said first and second transparent plates;
    a layer of photoconductive materials inserted between said liquid-crystal layer and said second transparent plate;
    a first electrode transparent to heat and inserted between said liquid-crystal layer and said layer of photoconductive material;
    a second electrode transparent to light and inserted between said layer of photoconductive material and said second transparent plate;
    means for temporarily illuminating said layer of photoconductive material at points representing said information to be visualized in order to cause said photoconductive material to conduct at said points;
    means for supplying said first and second electrodes with a first voltage in order to heat said layer of photoconductive material at said points which have been made conductive by said illuminating means, thus causing transition of the liquid-crystal layer to the isotropic state at locations in which said layer is adjacent to said points and producing light-scattering action of the liquid-crystal layer when the temporary illumination is stopped and said layer returns to the smectic state.

2. A device according to claim 1, wherein said illuminating means comprise a helium-neon laser which emits a visible light beam and means for scanning said second transparent plate with said light beam, said first electrode which is transparent to heat being opaque to light and reflecting in order to permit visual display by reflection from said first electrode through the first transparent plate.

3. A device according to claim 1, wherein said illuminating means comprise a laser which emits an invisible light beam and means for scanning said second transparent plate with said invisible light beam, said first electrode which is transparent to heat being also transparent to light in order to permit visual display by transmission through the entire display device.

4. A device according to claim 2, wherein said device further comprises a third electrode which is transparent to light and inserted between said first transparent plate and said liquid-crystal layer, and means for supplying said first and second electrodes with a second voltage for re-orienting the liquid crystal as a whole, thus erasing the information displayed in the device.

* * * * *